United States Patent [19]

Lazzari

[11] 3,848,217

[45] Nov. 12, 1974

[54] MAGNETORESISTIVE DEVICES AND TRANSDUCERS

[75] Inventor: Jean-Pierre Lazzari, Villiers Saint Frederic, France

[73] Assignee: Compagnie Internationale Pour L'Informatique, Versailles, France

[22] Filed: Dec. 15, 1972

[21] Appl. No.: 315,476

[30] Foreign Application Priority Data

Dec. 22, 1971 France .............................. 71.46103

[52] U.S. Cl. .................. 338/32 R, 324/46, 360/111

[51] Int. Cl. ............................................. H01c 7/16

[58] Field of Search ................ 338/32 R; 323/94 H; 346/74 M, 74 MC; 324/45, 46; 340/174.1 F, 174 EB; 179/100.2; 360/111

[56] References Cited

UNITED STATES PATENTS 3,480,926 11/1969 Oberg .......................... 340/174 EB 3,493,694 2/1970 Hunt .............................. 324/46 X

*Primary Examiner*—C. L. Albritton
*Attorney, Agent, or Firm*—Kemon, Palmer & Estabrook

[57] ABSTRACT

A magnetoresistive device responsive to the value and direction of an external magnetic field generated near an edge thereof by a localized source by a corresponding variation of an electrical current applied thereto comprises at least one magnetoresistive layer of anisotropic material having its easy axis of magnetization orientated at an angle which lies between 0° and 90° and preferably approximately 45° with respect to the direction of flow of electrical current through the device. The magnetoresistive layer is inserted between a pair of thicker high permeability magnetic layers when a more accurate localization of the source of the external magnetic field is required.

5 Claims, 13 Drawing Figures

MAGNETORESISTIVE DEVICES AND TRANSDUCERS

THE PRIOR ART

Magnetic materials are known which, when formed as thin layers or films of some hundreds of Angstroms thickness and submitted to an external magnetic field, exhibit an electrical resistance of a value varying with such a field. Fe-Ni ferromagnetic alloys and others exhibit such a magnetoresistive effect as for instance listed in pages 711–713 of a paper by M. C. VAN ELST in "PHYSICA," vol.XXV, 1959, pages 702–720 entitled "The Anisotropy in the Magnestoresistance of some nickel alloys."

When such a magnetoresistive layer is submitted to both an external magnetic field and a flow of electrical current from a constant voltage source, the value of the electrical current varies according to the value of the said field.

Since no magnetic flux is generated by such a magnetoresistive layer, it cannot be used as or in a transducer capable of writing on a magnetic recording device. On the other hand, it has been proposed for readout transducers and, inter alia, a paper of Robert P. HUNT in "IEEE Transactions on Magnetics," vol. MAG-7, No.1, Mar. 1971, describes "A Magnetoresistive Readout Transducer" of the kind concerned by the invention.

BRIEF SUMMARY OF THE INVENTION

The known embodiments of such magnetoresistive devices present certain drawbacks and insufficiencies. When the source of the external magnetic flux or field is highly localized with respect to the surface of the magnetoresistive layer, the variation of the electrical current is quite low. When the external magnetic flux passes through the surface with a substantial gradient of the magnetic field along the "height" of the layer, the resulting variation of electrical current does not accurately define the position of the source of the magnetic field with respect to the plane of the layer. Further, the "signal" consisting of the said variation of electrical current cannot indicate the direction of the magnetic flux unless the layer is biassed by a further magnetic field distinct from the source of the magnetic field to detect and "measure" from the magnetoresistive effect of the layer.

It is an object of the invention to provide a magnetoresistive device which does not require a biassing magnetic field to recognize the direction of the external magnetic field activating the layer.

It is a further object of the invention to provide magnetoresistive device such that a very accurate detection of the location of the external magnetic field source with respect to the magnetoresistive layer is obtained, even when the external source is highly localized, while preserving substantial variations of the value of the "signal" carrying electrical current from the layer.

A further object of the invention is to provide a magnetoresistive device that can be used as a part of a write-read transducer for digitally recorded information equipment such, for instance as, magnetic tape, drum or disk equipment.

Broadly summarized, the invention provides that, in a magnetoresistive device comprising at least one magnetoresistive layer of anisotropic material, the axis of easy magnetization of the layer is oriented at an angle between 0° and 90° and preferably approximately 45° with respect to the direction of the flow of the electrical current therethrough.

The invention further provides, when a more accurate location of the source of the external magnetic field is required, to place two thicker high permeability magnetic layers, one on each side of the magnetoresistive layer, in magnetostatic coupling relation with the magnetoresistive layer.

BRIEF DESCRIPTION OF THE DRAWINGS

FIG. 1 shows a side or edge view of such a layer in the magnetic field,

FIG. 2 defines the physical and geometrical parameters involved and,

FIG. 3 shows the variation of the magnetoresistive factor of the layer with respect to the value of the external magnetic field;

DETAILED DESCRIPTION

Figure 1:
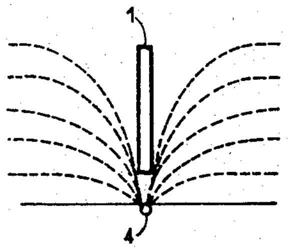
FIGS. 1 to 3 illustrate the behavior of a magnetoresistive layer when an external magnetic field is applied to the layer.

In the drawings, 1 is a magnetoresistive layer 200 to 300 A thick, made of a Fe-Ni alloy such as the one commercially known as Permalloy, the easy magnetization axis of which is shown at A. Said magnetoresistive member 1 is fed with an electrical current I. When an external magnetic field H from a source of magnetic flux 4 is applied to the layer, this current will vary with the value of said field. The source of magnetic flux 4 is localized in that it has an elongated shape. Its breadth is substantially equal to the breadth of the edge of the layer 1 from which it is spaced by at most a few microns. Its "thickness" may be assumed to be of the order of a few microns too. It must be understood that, in recording equipment, the source 4 will travel parallel to its breadth and, as shown in the FIGS. the source 4 is at a position for which the response of the magnetoresistive layer is maximum.

Figure 2:
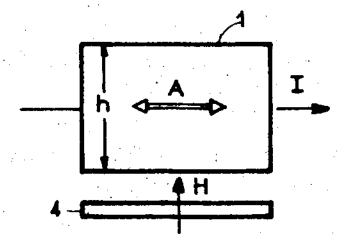
Figure 3:
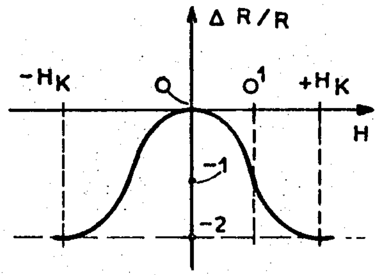
Figure 4:
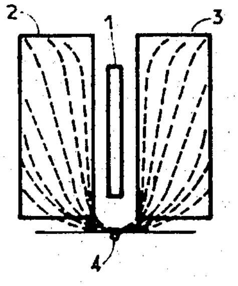
FIGS. 4 to 6 show views respectively corresponding to the views of FIGS. 1 to 3, applied to a magnetoresistive device according to the invention.

At normal ambient temperatures, the material of the layer 1 exhibits a negative magnetoresistive effect $\Delta R/R$ of the order of 2 percent. In a conventional magnetoresistive device as shown in FIGS. 1 and 2, the easy axis A is substantially parallel to the direction of the flow of the electrical current I within the layer and the variation of the magnetoresistive effect with respect to the variation of the value of the magnetic field H is shown in FIG. 3. When the value of H reaches the value of the field of anisotropy of the material of the layer, $H_K$, the layer is saturated in the direction of its hard magnetization axis. In order to determine the direction of the applied external magnetic field, it is necessary to provide a shift of the zero of the ordinate axis from 0 to $0^1$ and the shift is conventionally ensured by applying an additional permanent magnetic field to the layer 1.

Figure 5:
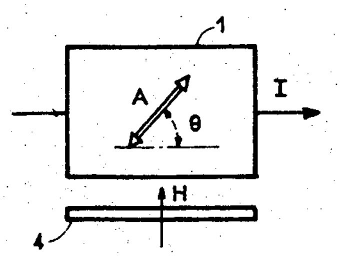
Figure 6:
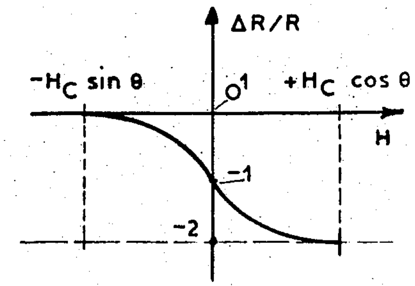
Figure 12:
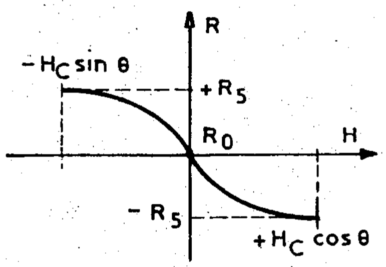
FIG. 12 shows the variation of the electrical resistance with the value of the external magnetic field in a magnetoresistive device according to the invention; and, FIG. 13 shows a lateral view of a read-write transducer for magnetic recording equipment, which embodies magnetoresistive devices according to the invention.

A magnetoresistive device according to the present invention does not require such an additional and troublesome magnetic field in that, as shown in FIG. 5, the easy axis of magnetization of the magnetoresistive layer 1 is inclined at an angle $\theta$ with respect to the direction of the flow of electrical current through the layer. The angle $\theta$ may advantageously be about 45°. The curve of variation of the magnetoresistive effect is as shown in FIG. 6. When the value of the external field H equals the value $H_c \cdot \cos\theta$, $H_c$ being the coercive field of the magnetic material of the layer 1, the magnetization in the layer is oriented perpendicular to the direction of the current I. When, on the other hand, $H = H_c \cdot \sin\theta$, the magnetization of the layer is parallel to the direction of the electrical current I. FIG. 12 shows the corresponding variation of resistance of the magnetoresistive device, R, plotted against the variation of the magnetic field H. When H equals O, the value of the magnetoresistive layer 1 is, for instance, Ro. When $H = -H_c \cdot \sin\theta$, the value of the resistance is $+R_s$ with respect to Ro. When $H = H_c \cdot \cos\theta$, the value of the resistance is $-R_s$ with respect to Ro. It then suffices to take the value Ro as a reference value in any load circuit for the "signal" from the magnetoresistive device for obtaining both the value and the direction of the external magnetic field H to which the magnetoresistive device is subjected.

The accuracy of the response of magnetoresistive layer depends not only upon the magnitude of the magnetoresistive effect in the layer 1 but also, and more importantly, upon the uniformity of the rotation of the vector of magnetization in the layer in the direction of the "height" h of the layer, FIG. 2. FIG. 1 shows in dotted lines the distribution of the lines of intensity of the magnetic field generated by the source 4 with respect to the layer 1 and it is apparent that the value of the field is not uniform along the "height." Consequently the rotation of the vector of magnetization will not be coherent throughout the layer and the response of the magnetoresistive device will be subject to a substantial attenuation. As stated above, the value of the external field which produces a complete rotation of the magnetization in the layer is about equal to the value of the field of anisotropy of the material of the layer when the demagnetizing fields in the *h* direction are small. When a localized source of magnetic field generates a field of a few hundreds of oersteds, which is quite normal for digitally recorded members such as tapes, disks or drums, or even such as "magnetir rules," the magnetoresistive layer is activated by an isofield line of a value substantially equal to 3 oersteds for the Fe-Ni alloy of the layer. Such a line is relatively far from the source 4 and consequently the localization of the source is very indefinite. The device could only be used in a readout transducer if the magnetic record to be read is of a low density of digits or marks. On the other hand it is desired to use such a magnetoresistive device for a readout of high density records such as for instance records where the bits do not exceed a maximum width of 5 microns with magnetic domain intervals not exceeding 15 microns.

In order to eliminate such a drawback and, on the other hand, to greatly improve the accuracy of response of a magnetoresistive member according to the invention, it is further provided, as shown in FIG. 2, to arrange the magnetoresistive layer 1 between two high permeability layers 2 and 3 thicker than the layer 1. Preferably though not imperatively, the layers 2 and 3 are made of anisotropic character. Each such layer may for instance have a thickness of at least 1,000 A up to 5 $\mu$ or more when the thickness of the layer 1 is between 200 and 300 A. Such layers as 2 and 3 are magnetostatically coupled to the magnetoresistive layer 1 and insulated therefrom by means of thin dielectric layers or films of a material such as $Si\ O_2$. Each dielectric film only need be a few hundreds of Angstroms in thickness.

More than one such layer as 2 or 3 may be provided on one side or on both sides of the magnetoresistive layer 1. When needed, a stack may be provided by placing one more magnetoresistive layer on the sides of the layers 2 and 3. Layers such as 2 and 3 are established over such additional magnetoresistive layers and so forth. Such a stack may be formed on a mechanically resistant substrate. The material of such layers as 2 and 3 may be the same as the material of the layer 1 when needed.

The layers 2 and 3, which are of high premeability due to their increased thickness, act as guiding members for the lines of intensity of the magnetic field from the source 4 so that the magnetoresistive layer 1 receives a substantially uniform magnetic field over its whole height, the magnetoresistive effect is optimized and the localizing of the source 4 occurs with a fair accuracy in the device. As the rotation of the magnetization vector is coherent within the layers 2 and 3, the rotation of the magnetization vector is also coherent and actually constant over the whole height of the layer 1 when the driving field H is of the same order of magnitude as the coercive field of the material of the layer 1. It may be said that the high permeability structure of the device acts as a magnetic field "transformer." The overall breadth of the magnetic structure defines the width of a "window" for localization of the source 4 with respect to the magnetoresistive device and the uniform magnetic flux applied to the layer 1 is maximum when the mid-plane of the source coincides with the vertical mid-plane of the device. Further, such a magnetoresistive device short-circuits any demagnetizing fields which may be generated by the magnetoresistive layer proper.

Figure 11:
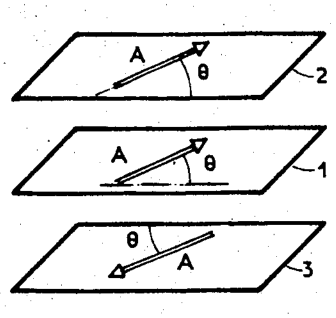
FIG. 11 shows an example of distribution of the directions of the easy axes of magnetization in the layers of an embodiment such as the one shown in FIGS. 9 and 10.

The presence of the high permeability layers further reinforces the action of the angular orientation of the axis of easy magnetization of the magnetoresistive layer with respect to the direction of the electrical current. As shown in FIG. 11, when no external magnetic field is applied to the device, the magnetization vectors of the layers 2 and 3 align on the easy magnetization axis of the magnetoresistive layer 1, one of them being however of opposite orientation from the two other ones, as shown for instance in the layer 3. When the external field is applied, the magnetization vectors of the layers 2 and 3 rotate by an angle depending on their thickness though this rotation is coherent throughout their heights. Because of the magnetostatic coupling existing between such layers 2 and 3 and the magnetoresistive layer 1, said rotation entails a rotation of the magnetization vector in the layer 1. From an adjustment of the thickness of the layers 2 and 3, the rotation may be made equal to the value of $\theta$.

The adjustment of the thickness of the layers 2 and 3 depends both of the physical parameters of the layers proper and of the corresponding parameters of the recording magnetic medium with which the device must be associated as a readout transducer of the record. E being the thickness of the layers and Br being the value of the remanent induction thereof, and e being the thickness of the recording medium an $Br_o$ being the value of the remanent induction thereof, the adjustment is so made as to satisfay the following relation: (i) $E \cdot Br \leq K \cdot e \cdot Br_o$, with K being an efficiency coefficient which is depending upon the distance between the surface of the record and the facing surface of the magnetoresistive device when associated in a recording readout apparatus. When said distance is zero, $K = 1$.

The following table gives examples for which the rotation of the magnetization vector will be equal to 45° in the layers 2 and 3:

| Recording medium | | Layers 2 and 3 | |
|---|---|---|---|
| e ($\mu$) | $Br_{o(gauss)}$ | E($\mu$) | Br (gauss) |
| 13 | 1,000 | 1.2 | 10,000 |
| 8 | 1,000 | 0.7 | 10,000 |
| 0.2 | 10,000 | 0.18 | 10,000 |
| 0.1 | 10,000 | 0.1 | 10,000 |

Figure 7:
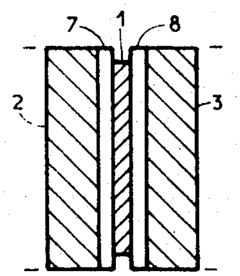
FIGS. 7 and 8 show, in respectively orthogonal cross-section views, a first embodiment of a magnetoresistive device according to the invention.
Figure 8:
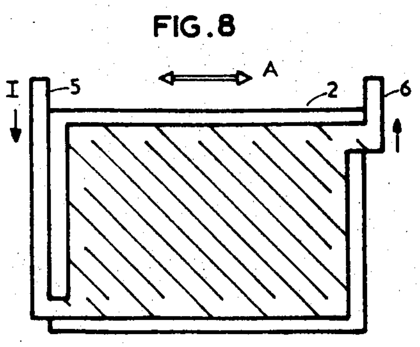

In the embodiment of FIGS. 7 and 8, the magnetoresistive layer 1 is made as a zig-zag layer the segments of which are slanted by 45° with respect to the lower edge of the layer 2 over which it is coated (with interposition of a dielectric film as above described). The electrical current input terminal is shown at 5 and the output terminal is shown at 6. The axis of easy magnetization of the material of the layer 1 is shown at A, parallel to the said edge and consequently at 45° with respect to the flow of the electrical current through the magnetoresistive layer 1. The dielectric film between layers 2 and 1 is shown at 7 in FIG. 7, and a similar film 8 is present between the layers 1 and 3 in the same figure.

Figure 9:
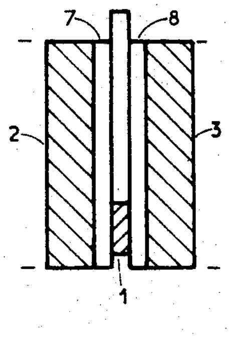
FIGS. 9 and 10 similarly show a second embodiment of a device according to the invention.
Figure 10:
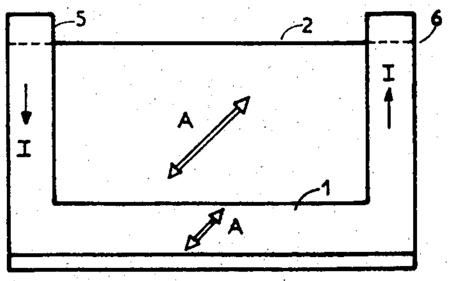

In the embodiment shown in FIGS. 9 and 10, the magnetoresistive layer 1 is shaped as a U-shaped layer the lower branch of which is parallel to the edge of the layer 2. The axes of easy magnetization of the layers 1, 2 and 3 are shown in FIG. 10 and they are slanted by 45° with respect to said edge. Said axes are obviously at 45° of the direction of the flow of the electrical current, from 5 to 6, in the magnetoresistive layer 1.

It must be understood that, in such embodiments, a mechanically resistant insulating substrate exists on one side of the structures. It must be noted that, in both embodiments, FIGS. 7–8 and 9–10, the magnetoresistive layer 1 is shown recessing from the edges of the layers 2 and 3 on the "airgap" side of the device. Such an arrangement provides a longer useful life for the transducer since, when the transducer operates in mechanical contact with the recording medium to read out information therefrom, the contacting edges of the layers 2 and 3 will first be the subject of the resulting mechanical erosion long before the corresponding edge of the magnetoresistive layer proper.

Figure 13:
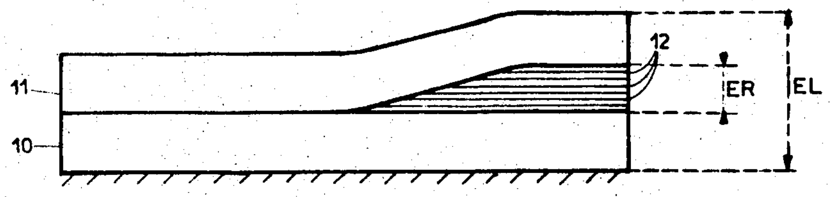

Further to their use as readout transducers, the devices according to the invention may be used in the embodiments of read-write transducers because when no electrical current is applied to the magnetoresistive layers (which layers are serially connected when the device comprises a stack of such layers as hereinbefore explained), the devices can plainly act as mere flux concentrating magnetic yoke or flux return plates. FIG. 13 shows a lateral partial cross-section view of such a transducer. Two magnetoresistive devices according to the invention are shown at 10 and 11 and between end portions thereof is formed an airgap within which a flat conductor winding coil 12 is formed. The operation is the following one: during a readout operation, the magnetoresistive devices are fed with an electrical current and read the information with an airgap substantially equal to EL: during a write-in operation, no current is applied to the magnetoresistive devices but the writing current is applied to the winding 12 and the writing operation is ensured with a writing airgap ER.

What is claimed is:

1. A magnetoresistive device comprising:

a layer of magnetoresistive anisotropic material, having an easy axis of magnetization at substantially 45° to the direction of electrical current flow therethrough;

a pair of layers of high permeability magnetic material, thicker than and sandwiched around said magnetoresistive layer; and electrically insulating films one positioned between each magnetoresistive and magnetic layers respectively to effect magnetostatic coupling between said magnetoresistive and magnetic layers.

2. A magnetoresistive device as defined by claim 1 in which said magnetoresistive layer has a zigzag shape, the segments of which are inclined with respect to an edge thereof to which the axis of easy magnetization is substantially parallel.

3. A magnetoresistive device as defined by claim 1 wherein said magnetoresistive layer is U-shaped and the lower branch of the "U" has its easy access of magnetization inclined with respect to the edge thereof.

4. A magnetoresistive device according to claim 1, wherein each thicker high permeability layer is of the same material as the magnetoresistive thin layer and is at least four times thicker than the said magnetoresistive layer.

5. A magnetoresistive device according to claim 4, wherein the magnetoresistive layer has an edge recessed with respect to the corresponding edges of the said thicker layers.

* * * * *